United States Patent
Newman et al.

(10) Patent No.: US 10,072,200 B2
(45) Date of Patent: Sep. 11, 2018

(54) METHOD FOR INCREASING DENSITY OF BRINE PHASE IN OIL-BASED AND SYNTHETIC-BASED WELLBORE FLUIDS

(71) Applicant: M-I L.L.C., Houston, TX (US)

(72) Inventors: Katerina Newman, Houston, TX (US); Chemsseddine Bouguetta, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/427,220

(22) PCT Filed: Sep. 4, 2013

(86) PCT No.: PCT/US2013/057913
§ 371 (c)(1),
(2) Date: Mar. 10, 2015

(87) PCT Pub. No.: WO2014/039467
PCT Pub. Date: Mar. 13, 2014

(65) Prior Publication Data
US 2015/0240145 A1  Aug. 27, 2015

Related U.S. Application Data

(60) Provisional application No. 61/699,063, filed on Sep. 10, 2012.

(51) Int. Cl.
*C09K 8/36* (2006.01)
*C09K 8/58* (2006.01)

(52) U.S. Cl.
CPC . *C09K 8/36* (2013.01); *C09K 8/58* (2013.01)

(58) Field of Classification Search
CPC . C09K 8/36; C09K 8/032; C09K 8/02; C09K 8/16; C09K 8/32; C09K 2208/30; C09K 8/03; C09K 2208/26; C09K 8/805; C09K 2208/18; C09K 8/08; C09K 8/206; C09K 8/52; C09K 8/62; C09K 8/72; C09K 8/05; C09K 8/26; C09K 8/424; C09K 8/46; C09K 8/70; C09K 8/76; C09K 8/00; C09K 8/04; C09K 8/12; C09K 8/502; C09K 8/80; C09K 2208/08; C09K 2208/24; C09K 8/035; C09K 8/28; C09K 8/34; E21B 43/16; E21B 21/00; E21B 43/267; E21B 43/04; E21B 7/00; E21B 21/003; E21B 21/062; E21B 21/068; E21B 43/26; E21B 33/138; E21B 33/14; E21B 47/00; E21B 21/012; E21B 21/065
See application file for complete search history.

(56) References Cited

U.S. PATENT DOCUMENTS

| | | | |
|---|---|---|---|
| 2,861,042 A * | 11/1958 | Watkins | B01F 17/0085 507/129 |
| 4,306,980 A * | 12/1981 | Brandt | C09K 8/36 507/103 |
| 6,218,342 B1 | 4/2001 | Patel | |
| 6,422,325 B1 | 7/2002 | Krieger | |
| 6,790,722 B1 | 9/2004 | Patel | |
| 6,806,233 B2 | 10/2004 | Patel | |
| 2001/0051593 A1 | 12/2001 | Patel | |
| 2003/0092580 A1* | 5/2003 | Mackey | C09K 8/36 507/100 |
| 2004/0011990 A1* | 1/2004 | Dunaway | C09K 5/10 252/62 |
| 2007/0298976 A1 | 12/2007 | Ballard | |
| 2011/0220418 A1* | 9/2011 | Clark | E21B 21/068 175/66 |
| 2011/0232909 A1* | 9/2011 | Kapila | B01F 7/00766 166/305.1 |

FOREIGN PATENT DOCUMENTS

WO   WO2010/060092   * 5/2010

OTHER PUBLICATIONS http://www.glossary.oilfield.slb.com/Terms/s/synthetic-base_mud.aspx downloaded on Jul. 11, 2016.*
http://www.glossary.oilfield.slb.com/Terms/o/oil-base_mud.aspx downloaded on Jul. 11, 2016.*
http://www.glossary.oilfield.slb.eom/Terms/s/synthetic-base_mud.aspx downloaded on Jul. 11, 2016.*
http://www.glossary.oilfield.slb.eom/Terms/o/oil-base_mud.aspx downloaded on Jul. 11, 2016.*

* cited by examiner

*Primary Examiner* — Kumar R Bhushan
(74) *Attorney, Agent, or Firm* — David J. Smith

(57) ABSTRACT

Embodiments disclosed herein relate to a method including feeding an invert emulsion wellbore fluid, or a previously used invert emulsion wellbore fluid, into a mixing unit; adding an additive to the mixing unit; delivering the invert emulsion wellbore fluid and the additive to one or more stages of the mixing unit, the mixing unit having a shear rate ranging from about 10,000 s-1 to about 100,000 s-1. The invert emulsion wellbore fluid includes a non-oleaginous fluid being the discontinuous internal aqueous phase of the wellbore fluid, and an oleaginous fluid being the continuous external phase of the wellbore fluid.

15 Claims, 5 Drawing Sheets

METHOD FOR INCREASING DENSITY OF BRINE PHASE IN OIL-BASED AND SYNTHETIC-BASED WELLBORE FLUIDS

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the wellbore fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the wellbore fluid takes the form of a "mud," i.e., a liquid having solids suspended therein. The solids function to impart desired rheological properties to the wellbore fluid and also to increase the density thereof in order to provide a suitable hydrostatic pressure at the bottom of the well. The wellbore mud may be a water-based, an oil-based, or a synthetic-based mud.

Many types of fluids have been used in well bores particularly in connection with the drilling of oil and gas wells. The selection of an oil-based/synthetic-based wellbore fluid involves considering the characteristics of such fluids in a particular application. The primary benefits of selecting an oil-based/synthetic-based wellbore fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. A beneficial property of oil-based/synthetic-based wellbore fluids is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based wellbore fluids are used. In contrast, oil-based wellbore fluids provide a thin, slick filter cake which helps to prevent pipe sticking and thus the use of the oil-based wellbore fluids can be justified.

Oil-based and synthetic-based wellbore fluids are generally invert emulsions. The components of the invert emulsion fluids include an oleaginous liquid such as hydrocarbon, vegetable, or synthetic oils which serves as a continuous phase, a non-oleaginous liquid such as water or brine solution which serves as a discontinuous phase, and an emulsifying agent. The oil/water ratio of invert emulsion fluids is traditionally within the range of 60/40 to 85/15. As used herein, emulsifying agent and surfactants are used interchangeably. The emulsifying agent serves to lower the interfacial tension of the liquids so that the non-oleaginous liquid may form a stable dispersion of fine droplets in the oleaginous liquid. Additionally, such invert emulsion wellbore fluids generally contain one or more weighting agents, surfactants, viscosifiers, fluid loss control agents or bridging agents.

The drawback to use of invert emulsion fluids, particularly oil-based or synthetic-based wellbore fluids, is their value (due to the oil content) and some environmental concerns associated with the disposal of oils. Therefore, wellbore fluids are typically recycled or reused.

SUMMARY

In one aspect, embodiments disclosed herein relate to a method including feeding an invert emulsion wellbore fluid into a mixing unit, adding an additive to the mixing unit, and delivering the invert emulsion wellbore fluid and the additive to one or more stages of the mixing unit having a shear rate ranging from about 10,000 s-1 to about 100,000 s-1.

In another aspect, embodiments disclosed herein relate to a method including providing a used invert emulsion wellbore fluid including a non-oleaginous fluid and an oleaginous fluid to a mixing unit having a shear rate ranging from about 10,000 to about 100,000 s-1, and adding a dry additive to the mixing unit. The dry additive may be selected from a salt, a salt tolerant clay, and a synthetic polymer, and wherein the additive is dispersed in the non-oleaginous fluid in a sufficient concentration to change at least one property of the invert emulsion wellbore fluid. The non-oleaginous fluid is the discontinuous internal aqueous phase of the wellbore fluid and the oleaginous fluid is the continuous external phase of the wellbore fluid.

In another aspect, embodiments disclosed herein relate to a method including measuring a water activity of a wellbore formation, measuring a water activity of an internal aqueous phase of an invert emulsion wellbore fluid, feeding the invert emulsion wellbore fluid to a mixing unit having a shear rate ranging from about 10,000 s-1 to about 100,000 s-1, and adding a dry additive to the mixing unit to produce a product stream. The dry additive may be selected from a salt, a salt tolerant clay, and a synthetic polymer. The additive is dispersed in the internal aqueous phase in a sufficient concentration to balance the water activity of an internal aqueous phase of the product stream to the water activity of the wellbore formation.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects of the disclosure will be apparent from the following description and the appended claims.

DETAILED DESCRIPTION

In one aspect, embodiments disclosed herein are generally directed to methods related to wellbore fluids that are useful in the drilling, completing, and working over of subterranean or off-shore wells, oil and gas wells, in particular to methods of mixing and modifying wellbore fluids.

In accordance with embodiments of the present disclosure, a wellbore fluid mixed previously (and optimally used in drilling, completions or working over a well) may be adjusted prior to reuse. For example, the density or salinity concentration may be altered, either higher or lower through addition of brine or solid salt particles. In some embodiments, the properties may be adjusted by changing the properties of the non-oleaginous phase of invert emulsions. The wellbore fluid may be collected from a wellbore prior to having its properties changed.

Figure 1:
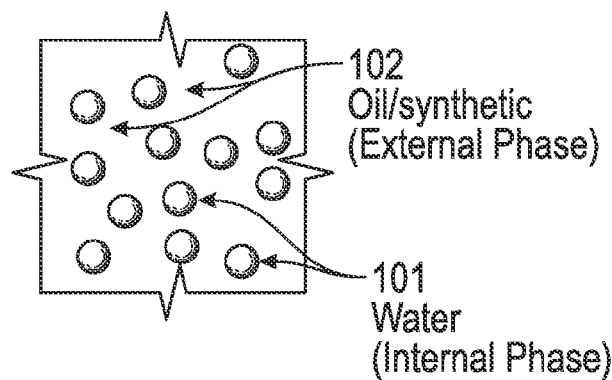
FIG. 1 is a schematic illustration of an invert emulsion in accordance with embodiments disclosed herein.

In one embodiment, the wellbore fluid may be an invert emulsion fluid that may include a non-oleaginous internal phase and an oleaginous external phase. The non-oleaginous internal phase may include water or an aqueous fluid including a high density brine solution that may function as a weighting agent. The oleaginous external phase may include an oleaginous fluid such as diesel or other suitable hydrocarbon or synthetic oil. A schematic illustration of an invert emulsion is shown in FIG. 1. The non-oleaginous internal phase 101 may be water and the oleaginous external phase 102 may be oil or synthetic based wellbore fluids. Optionally, other components of the invert emulsion may include one or more of an emulsifier, a viscosifying agent, a wetting agent, and a cleaning agent.

The oleaginous fluid used for formulating the invert emulsion fluids used in embodiments disclosed herein are liquids, such as, a natural or synthetic oil. In some embodiments, the oleaginous fluid may be selected from the group including diesel oil, mineral oil, such as polyolefins, polydiorganosiloxanes, siloxanes or organo-siloxanes, and mixtures thereof. The concentration of the oleaginous fluid should be sufficient so that an invert emulsion forms and may be less than about 99% by volume of the invert emulsion. However, generally the amount of oleaginous fluid may be sufficient to form a stable emulsion when utilized as the continuous phase. In various embodiments, the amount of oleaginous fluid may be at least about 50, at least about 65 percent, at least about 70 percent, and at least about 75 percent by volume of the total fluid. In other embodiments, the amount of oleaginous fluid is from about 50 to about 95 percent by volume and from about 70 to about 85 percent by volume of the invert emulsion fluid.

The non-oleaginous fluid also used in the formulation of the invert emulsion fluids is a liquid, for example, an aqueous liquid. In some embodiments, the non-oleaginous fluid may be selected from the group including sea water, a brine containing organic and/or inorganic dissolved salts, liquids containing water-miscible organic compounds and combinations thereof. The amount of the non-oleaginous fluid may be less than the theoretical limit typically used for forming an invert emulsion. In various embodiments, the varying amount of non-oleaginous liquid may be at least about 1 percent, at least about 5 percent, and greater than about 10 percent by volume of the total fluid. Correspondingly, the amount of the non-oleaginous fluid should not be so great that it cannot be dispersed in the oleaginous phase. Thus, in some embodiments, the amount of non-oleaginous fluid is less than about 70% by volume and from about 1% to about 70% by volume. In another embodiment, the non-oleaginous fluid is from about 10% to about 60% by volume of the invert emulsion fluid.

Figure 2:
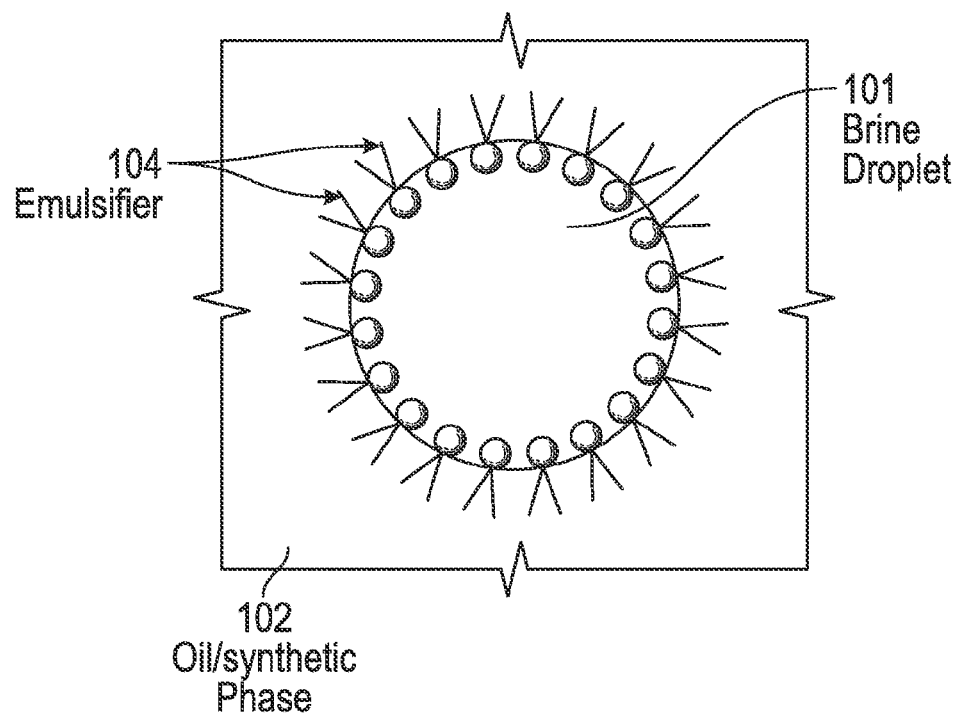
FIG. 2 is another schematic illustration of an invert emulsion in accordance with embodiments disclosed herein.

As illustrated in FIG. 2, in some embodiments, the internal phase 101 may include a brine containing salts of alkali and alkaline earth metals which may or may not include suspended solids. For example, brines formulated with high concentrations of sodium potassium, or calcium salts of the halides, formate, acetate, nitrate, and the like; cesium salts of formate, acetate, nitrate, and the like, as well as other compounds that should be well known to one of skill in the art, can be used as weighting agents. The selection of a weighting agent may partially depend on the desired density of the wellbore fluid, as known by one of ordinary skill in the art.

Also shown in FIG. 2, an emulsifier 104 used in the invert emulsion wellbore fluid should be selected so as to form a stable invert emulsion. The emulsifier has a hydrophilic-lipophilic balance (HLB) value which indicates the polarity of the molecules in a range of 1 to 40 that increases with increasing hydrophilicity of the emulsifier. Examples of emulsifiers may include VERSAWET™ and VERSA-COAT™, which are commercially available from M-I L.L.C., Houston, Tex. Alternatively, an amine-based acid sensitive emulsifier such as those described in U.S. Pat. Nos. 6,218,342, 6,790,811, and 6,806,233, for example.

In some embodiments, invert emulsion may be termed as "tight emulsions." A tight emulsion (also referred to as a tighten up emulsion mud) may be an emulsion having small and closely distributed droplets, which can be difficult to break. Emulsions may be classified by their stability and emulsion stability may be characterized by subjecting the emulsion to the test standard for the industry, such as those specified by American Petroleum Institute at API Recommended Practice 13B-2, Fourth Edition (March 2005). Tight emulsions may use chemicals, shear or both to emulsify the non-oleaginous particles into smaller droplets to prevent the emulsion from breaking, or coming apart. The use of an emulsion in drilling includes the fluid being subjected to very high shear as it is jetted through a drill bit nozzle into the well downhole resulting in further tightening up of the emulsion when it is returned to the surface for recycling or reuse. When the wellbore fluid is returned to the surface, the emulsions may have adherence properties that strongly prevent emulsion destruction or access for any particles to enter the internal phase of the emulsion. In terms of colloidal chemistry, tight emulsions are kinetically stable emulsions having higher sedimentation stability and aggregative stability. The excess Gibbs energy per internal phase droplet is relatively high. Due to this phenomenon, dry particles, such as salt molecules cannot easily reach the non-oleaginous phase of an invert emulsion (water-in-oil emulsion) and an increased amount of energy, or length of time, may be used to increase salinity of the non-oleaginous phase.

The stability/instability of the emulsions may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregation into the macroscopic form, thus rendering the dispersions metastable. Emulsions are metastable systems for which phase separation of the oil and water phases represents the most stable thermodynamic state due to the addition of a surfactant to reduce the interfacial energy between oil and water.

Oil-in-water, or invert, emulsions are typically stabilized by both electrostatic stabilization (electric double layer between the two phases) and steric stabilization (van der Waals repulsive forces), whereas invert emulsions (water-in-oil) are typically stabilized by steric stabilization. Because one mechanism can be used to stabilize an invert emulsion, invert emulsions are generally more difficult to stabilize, particularly at higher levels of the internal phase, and often experience highly viscous fluids.

Thus, embodiments of the present disclosure relate to invert emulsion fluids which may or may not be stabilized by an emulsifying agent without substantial increases in viscosity. As the internal aqueous phase of a given fluid system increases, the viscosity and rheological profile of the fluid also increases due to the greater concentration of the dispersed internal phase. In particular, in accordance with embodiments of the present disclosure, the fluids may possess a high shear viscosity of less than 200 at 600 rpm, and a low shear viscosity of less than 40 at 6 and 3 rpm, and less than 20 at 6 and 3 rpm in particular embodiments (all of which are measured rotational v as per API RP 13B-1 Recommended Practice for Field Testing Water-based Drilling Fluids, Fourth Edition (Identical to ISO 10414-1:2008), standard published Mar. 1, 2009 by American Petroleum Institute.

The wellbore fluid may also possess an internal aqueous phase within the external oleaginous phase. Specifically, upon application of an electric field to an invert emulsion fluid, the emulsified non-oleaginous phase, which possesses charge, will migrate to one of the electrodes used to generate the electric field. The incorporation of emulsifiers in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Fourth Edition (March 2005), is often used to determine the stability of the emulsion. ES is determined by applying a voltage-ramped, sinusoidal electrical signal across a probe (including of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 µA. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder to break would be the emulsion created with the fluid, and the more stable the emulsion is. While stability of an emulsion may be necessary for control of the well, the stability also makes it difficult to modify the fluid after formulation, for example, to add additional salt content to weight up the fluid due to the high excess Gibbs energy contained in each emulsion droplet. Due to this phenomenon, salt molecules cannot easily reach the internal phase of an invert emulsion without sufficient high energy input to increase the salinity of the internal phase.

The term "HLB" (Hydrophilic Lipophilic Balance) refers to the ratio of the hydrophilicity of the polar groups of the surface-active molecules to the hydrophobicity of the lipophilic part of the same molecules. One skilled in the art would appreciate that an HLB value may be calculated by considering the molecular weight contributions of the respective hydrophilic and lipophilic portions and taking the ratio thereof (divided by 5). Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. Generally, to form a water-in-oil emulsion, an emulsifier (or a mixture of emulsifiers) having a low HLB, such as between 3 and 8, may be desirable. In a particular embodiment, the HLB value of the emulsifier may range from 4 to 6.

In particular embodiments, the emulsifier may be used in an amount ranging from 1 to 15 pounds per barrel, and from 2 to 10 pounds per barrel, in other particular embodiments.

In addition to the emulsifying agent that stabilizes the oleaginous continuous phase and non-oleaginous discontinuous phase, the wellbore fluids may also include, for example, weighting agents, such as barite.

Figure 3:
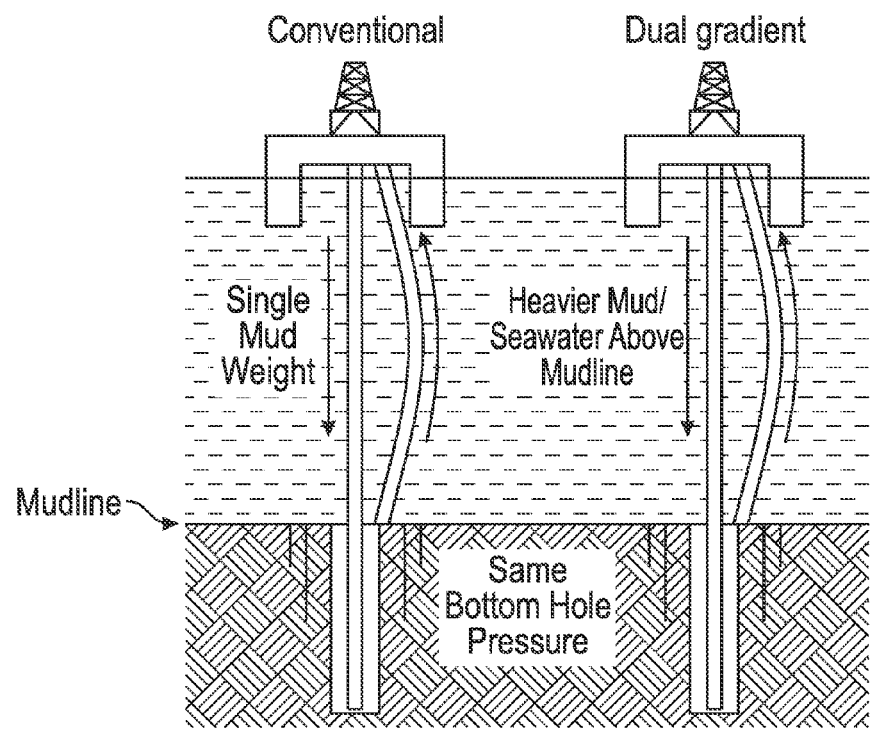
FIG. 3 is a schematic illustration of the use of invert emulsions to create hydrostatic pressure in accordance with embodiments disclosed herein.

In some embodiments, drilling methods may employ wellbore fluids that have to be altered after having already been prepared. FIG. 3 illustrates drilling methods including conventional drilling and dual gradient drilling (DGD) wherein two weights of wellbore fluid may be employed. On the left side of the figure, conventional drilling utilizes a single wellbore fluid weighted with additives in the borehole. DGD, shown on the right side of the figure, utilizes two weights of wellbore fluid—one above the mudline, another below. These two different weights of wellbore fluid may be accomplished by mixing a first wellbore fluid and then changing the properties of the wellbore fluid when the second weight of the wellbore fluid is to be pumped downhole. DGD allows drillers to closely match the pressures presented by nature and may eliminate water depth as a consideration in well design. DGD also allows drillers to detect and appropriately react to downhole pressure changes, which can enhance the safety and efficiency of drilling operations.

To adjust the properties of the non-oleaginous fluid, additives or dry ingredients may be mixed, dispersed or dissolved into the wellbore fluid. In some embodiments, the additive is a dry salt that is dissolvable in an aqueous fluid such as, but not limited to, alkali and alkaline earth halides, organic salts or mixtures and combinations of these. The dry salt may include, but is not limited to, sodium chloride, sodium bromide, calcium chloride, calcium bromide, potassium chloride, ammonium chloride, magnesium chloride, sodium nitrate, potassium acetate, zinc bromide, and zinc chloride. In some embodiments, the dry salt may be added to the invert emulsion and allowed to dissolve over a period of time. The dissolution of the dry salt into the invert emulsion may weaken the emulsion.

Examples of apparatus for mixing dry ingredients to invert emulsion wellbore fluids include, but are not limited to, mechanical agitators, nozzles, pumps (low pressure, high pressure, or high pressure triplex), drill bit nozzles, or rotor-stator mixers. Mechanical agitators may include impellers and can achieve shear rates up to approximately 10,000 $s^{-1}$. The efficiency of a mechanical agitator may depend on the geometry of the mixing vessel, i.e., tank, jar, etc. Low pressure (from about 50 to about 80 psi) pumps and nozzles may achieve shear rates ranging from about 3,000 to about 5,000 s$^{-1}$. High pressure (from about 700 to about 800 psi) pumps and nozzles may achieve shear rates ranging from about 30,000 to about 50,000 s$^{-1}$. High pressure triplex pumps or drill bit nozzles may achieve shear rates ranging from about 30,000 to about 80,000 s$^{-1}$. These rates may occur when the wellbore fluid is passed through a drill bit downhole during drilling operations. Rotor-stator mixers may achieve shear rates ranging from about 10,000 to about 100,000 s$^{-1}$. Different fluids and dry ingredients may require different shear rates. Shear rates may depend on the geometry of a mixer and the geometry of a mixing chamber/tank. One of ordinary skill in the art will be able to determine the appropriate shear rate for use in embodiments disclosed herein.

Figure 4:
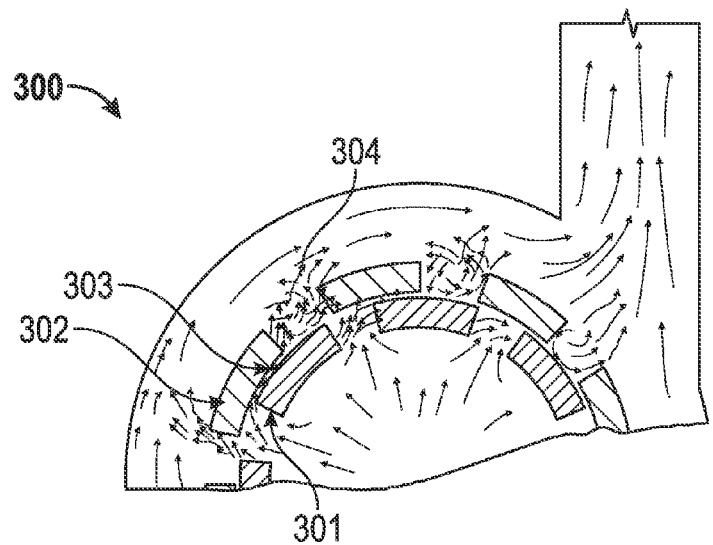
FIG. 4 is a schematic illustration of high shear mixing apparatus in accordance with embodiments disclosed herein.

In some embodiments, high shear mixing units of a rotor/stator design may be either single or multi-stage. An embodiment of a single stage mixing unit 300, such as a rotor-stator mixing unit, is shown in FIG. 4, including a rotor 301 and a stator 302. While the embodiment shows the rotor 301 being interior to the stator 302, in other embodiments, the rotor 301 may be exterior to the stator 302. The motion of the rotor 301 creates a centrifugal force on the wellbore fluid, pushing it toward the stator 302. Within a gap 303, between the rotor 301 and the stator 302, the fluid is sheared and dry particles are reduced in size and dispersed. The fluid may also be subject to shearing and/or dispersion within apertures 304 between the stator 302. The fluid may also subjected to additional hydraulic shear as the fluid is forced at high velocities through narrow perforations (not shown) which may be machined into the stator 302. In some embodiments, shear rates between 30,000-50,000 s$^{-1}$ may be achieved, while in still other embodiments, shear rates may be achieved between 30,000-80,000 s$^{-1}$. To achieve such shear rates, methods and/or apparatus as described in U.S. patent application Ser. No. 13/129,429 filed on May 16, 2011, may be used.

Figure 5:
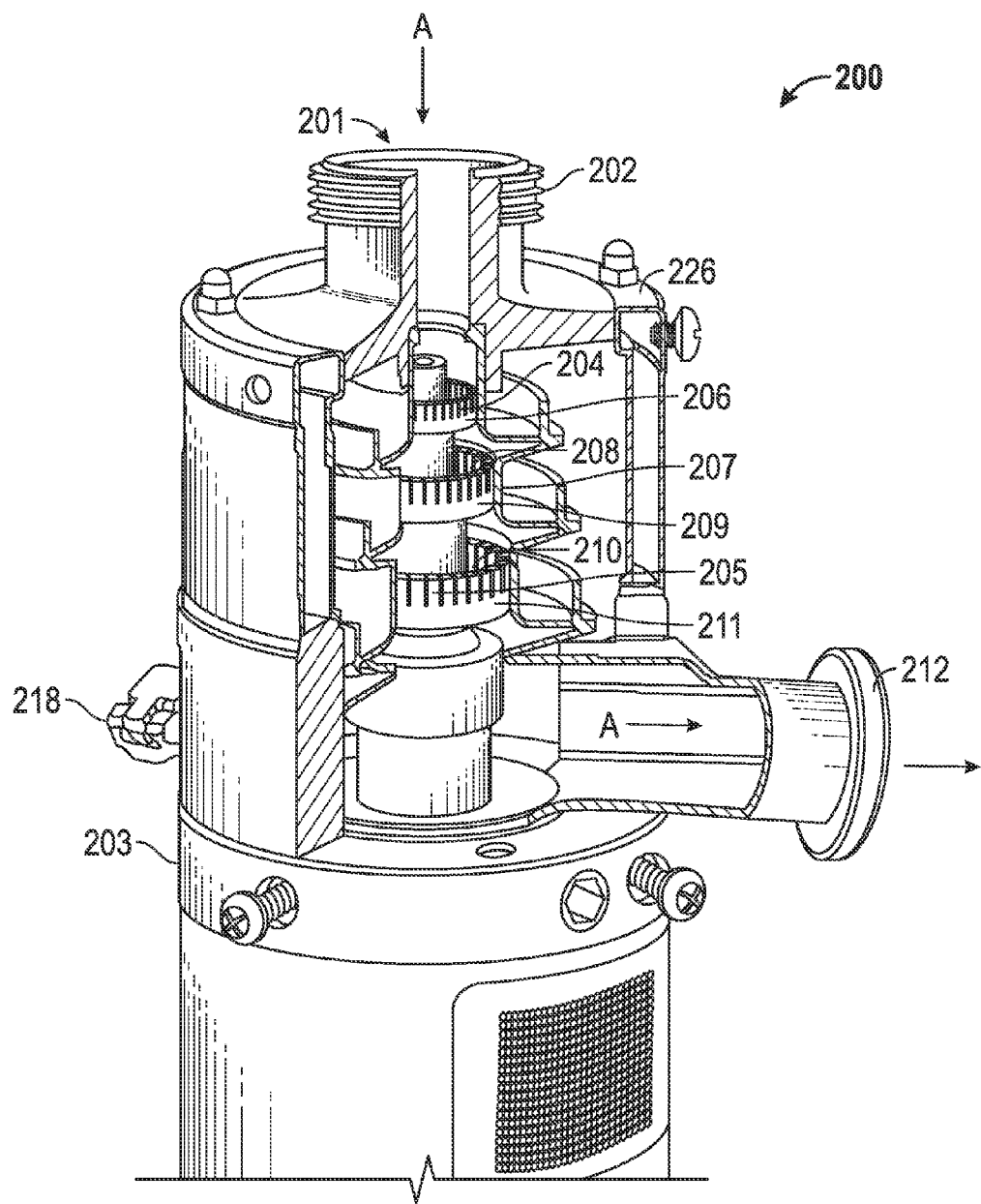
FIG. 5 is a schematic illustration of a single pass inline mixing operation in accordance with embodiments disclosed herein.

The gap 303 may provide a micron-size tolerance between the rotor 301 and the stator 302. When passed through rotor-stator assembly, that includes gap 303, dry particles can be reduced to micron size by interacting with surfaces and teeth of rotor and stator, fluid layers, emulsion droplets and between each other. Such complex interaction may not only disperse the dry particles, but also deliver the micro-size particles into the non-oleaginous fluid where the dry particles may dissolve. The rotor-stator may provide a high mixing energy input without the safety issues associated with high pressure apparatuses. The rotor-stator mixing unit provides the high mixing energy input without high temperature and/or pressure other methods may use to achieve some similar shear rates Referring to FIG. 5, a partial cross-section of a mixing unit 200 according to embodiments of the present disclosure is shown. In this embodiment, mixing unit 200 has an inlet line 201 configured to receive a flow of wellbore fluid from a wellbore fluid source (not shown). The inlet line 201 may have a threadable, flanged, sanitary, or other type connection 202, thereby allowing hoses, pipes, or other types of conduit to be connected thereto. As fluid is provided into inlet line 201 along path A, the fluid flows into body 203, and disperses around rotor 204. As rotor 204 rotates, the centrifugal force causes the wellbore fluid to be forced radially outward, thereby moving through rotor teeth 205. As the fluid is forced radially outward through rotor teeth 205, the fluid continues to move outward through stator teeth 206 and into contact with sidewall 207. As used herein, teeth refers to spaces, or slots, of a rotor or stator through which fluids may flow, the spacing between teeth referred to as tooth spacing.

The fluid continues to be forced down body 203 and through a second set of teeth corresponding to second rotor 208. The fluid is forced through the second set of teeth, through stator teeth 209, and into contact with the sidewall 207 of body 203. After passing through the second set of corresponding teeth, the fluid continues to flow down the body 203 of mixer 200 to a third set of rotor teeth 210 and stator teeth 211. The fluid is forced through the third set of corresponding teeth and continues to flow along path A to outlet 212.

Outlet 212 may include a threadable, flanged, sanitary, or other type connection capable of being connected to hoses, pipes, or other conduits, thereby allowing the transference of mixed wellbore fluid from mixing unit 200 to holding tanks (not shown) or other infrastructure at a drilling site or fluid processing plant. In certain aspects, mixing unit 200 may include varied configurations of rotor and/or stator assemblies. For example, in certain aspects, mixing units 200 may include two sets of corresponding teeth formed from a dual rotor/stator assembly. In other aspects, mixing unit 200 may have less or more than three sets of corresponding teeth, such as one, four, five, or more. In one embodiment, a multiple stage high shear mixing unit includes an inlet for receiving wellbore fluid and a body in fluid communication with the inlet. The body of the mixing unit may have at least a first and second rotor/stator combination, wherein the first and second rotor/stator combination has numerous corresponding teeth. During operation, a fluids engineer may actuate the mixing unit by starting a motor, thereby turning a drive shaft of the mixing unit, causing the rotors to rotate relative to their respective stators.

The additive may be added via any suitable device capable to deliver the additive (e.g., dry and/or liquid ingredient) such as wellbore fluid, into the mixing chamber of the mixing unit 200. In some embodiments, the additive may be added to the mixing chamber directly or the additive may be pre-mixed into the wellbore fluid prior to processing through a rotor-stator mixing unit.

Figure 6:
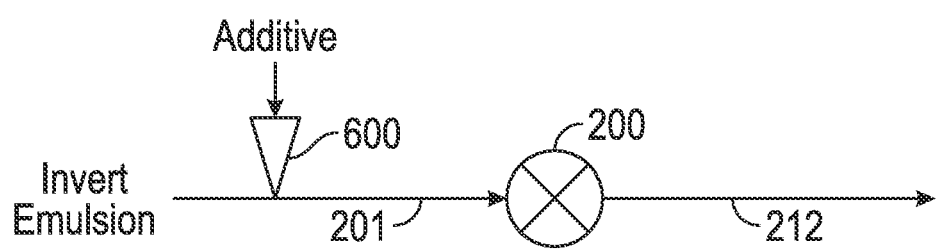
FIG. 6 is a schematic illustration of a first inline mixing operation in accordance with embodiments disclosed herein.
Figure 7:
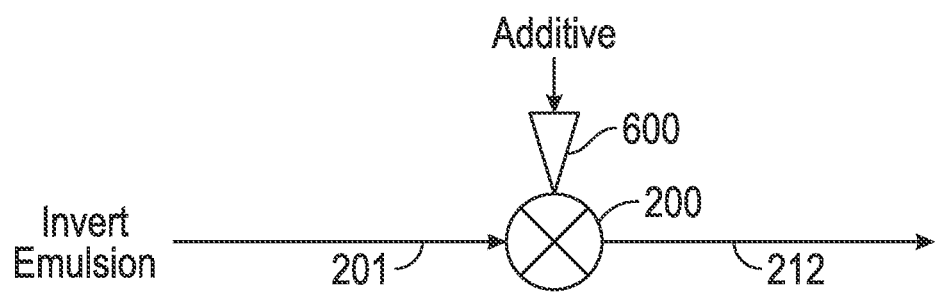
FIG. 7 is a schematic illustration of a second inline mixing operation in accordance with embodiments disclosed herein.

Referring to FIG. 6, additives may be added via hopper 600 to the inlet line 201 along with the invert emulsion. The additives are fed upstream the mixing unit 200. The additives and invert emulsion then enter the mixing unit 200 to produce an invert emulsion having an increased salinity via the outlet 212. In some embodiments, the hopper 600 may be any device that delivers the additive to the inlet line. In an alternate embodiment, as shown in FIG. 7, the hopper 600 may feed the additive directly into the mixing unit 200.

Figure 8:
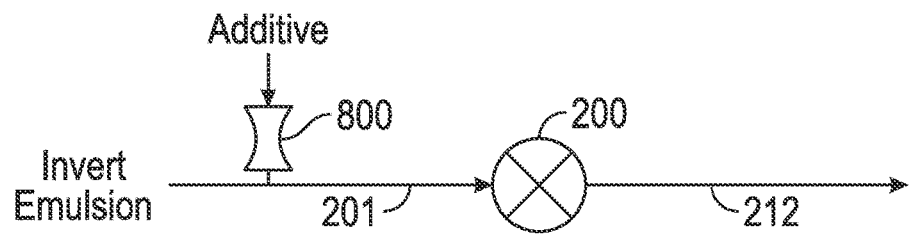
FIG. 8 is a schematic illustration of a third inline mixing operation in accordance with embodiments disclosed herein.

In an alternate embodiment, shown in FIG. 8, an additive may be added via a pressure drop mechanism 800 to the inlet line 201 along with the invert emulsion. The additive and invert emulsion then enter the mixing unit 200 to produce an invert emulsion having an increased salinity via the outlet 212. In some embodiments, the pressure drop mechanism 800 may be an eductor or any device that operates on the principle of pressure drop or vacuum to deliver the dry ingredient to the inlet line.

Figure 9:
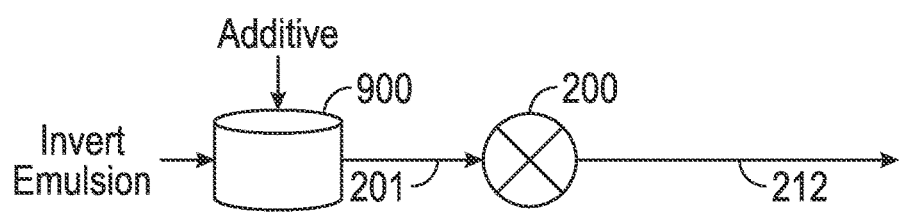
FIG. 9 is a schematic illustration of a fourth inline mixing operation in accordance with embodiments disclosed herein.

In a further alternate embodiment as shown in FIG. 9, the additive and invert emulsion may be mixed in a tank 900 prior to being fed (i.e., introduced, added) to the mixing unit 200 via the inlet line 201.

In another embodiment, a method may include providing a used invert emulsion wellbore fluid including a non-oleaginous fluid, wherein the non-oleaginous fluid is a discontinuous internal aqueous phase of the wellbore fluid, and a oleaginous fluid, wherein the oleaginous fluid is a continuous external phase of the wellbore fluid, to a mixing unit having a shear rate ranging from about 10,000 to about 100,000 s$^{-1}$. As disclosed herein, a used invert emulsion wellbore fluid may refer to an oil-based or synthetic-based drilling fluid returned after being pumped downhole. The method also includes adding an additive to the mixing unit, wherein the additive is selected from a salt, a salt tolerant clay, and a synthetic polymer, and wherein the additive is dispersed in the non-oleaginous fluid in a sufficient concentration to change at least one property of the invert emulsion wellbore fluid. In yet another embodiment, the method further includes adding the additive in a sufficient concentration to change (e.g., increase) the water activity, density of brine, or salinity of the water phase of the invert emulsion wellbore fluid.

The present application discloses the mixing, dispersing, and dissolution of an additive (e.g., dry salt) into previously made and used wellbore fluid (i.e., mud). Thus, recycled wellbore fluid may be brought to a desired quality (e.g., salinity) by the addition of the additive. By way of example only, to increase the chloride concentration of the aqueous phase of an invert emulsion wellbore fluid, an additive such as a dry salt (e.g., $CaCl_2$) may be added to used or newly produced wellbore fluid.

In an embodiment, a method may include measuring a water activity of a wellbore formation and measuring a water activity of an internal aqueous phase of an invert emulsion wellbore fluid. Water activity may include, but is not limited to, properties such as salinity and density. In another embodiment, the method may include adding an additive to the mixing unit to produce a product stream, wherein the additive is selected from a salt, a salt tolerant clay, and a synthetic polymer, wherein the additive is dispersed in the internal aqueous phase in a sufficient concentration to balance the water activity of an internal aqueous phase of the product stream to the water activity of the wellbore formation.

Various stator/rotor combinations (e.g., rotor-stator mixing units), also referred to as high shear mixers, may be envisioned according to embodiments of the present disclosure. In some embodiments, there may be three stators and three corresponding rotors. Therefore, each rotor-stator combination may include three rows of corresponding teeth. When assembled, the rotor-stator combination may include three or more sets of corresponding teeth, thereby further increasing the shearing action of the mixing unit. Each stator-rotor combination may be referred to as a stage. When assembled in the body of the mixing unit, the fluid may pass through each stage progressively, thereby further shearing the fluid with each subsequent stage the fluid passes through.

Depending on the shearing action required for a particular wellbore fluid, each stage may include corresponding teeth having a different gap (wherein gap is the distance between the rotor and stator), or a different spacing between individual teeth (e.g., tooth spacing). Accordingly, different combinations of gap and tooth spacing may be used to produce a fluid with a particular rheology. Examples of different stages may include coarse, medium, fine and/or superfine stages. A coarse stage may have a greater gap or greater distance between individual teeth, while a superfine stage may have a relative low distance gap and/or tooth spacing. In still other embodiments, one or more stages may be removed, thereby resulting in a mixing unit with less than the maximum number of potential stages. For example, a three stage mixing unit may be configured with only two stages. In other aspects, multiple stages may be substantially the same (e.g., two fine stages and one superfine stage) or all three stages may be different (e.g., one coarse stage, one fine stage, and one superfine stage). The stages used in a particular mixing unit may vary according to the type of wellbore fluid being mixed or the particular requirements of a mixing operation.

In some aspects, the teeth of the rotors and stators may be coated or constructed from various materials to increase their resistance to wear. For example, in certain applications, the rotors and stators may be constructed from stainless steels, such as ferritic, martensitic, duplex, high performance austenic, and high performance duplex. Other materials and coatings may include tungsten carbide, nickel and silicon alloys (e.g., NiSil), Ni-hard and other alloys containing nickel, chromium, and molybdenum, 316 and 440 stainless steel, and polyurethane. Such materials may further be coated with elastomeric materials and/or polymers to further prevent the rotors and stators from experiencing wear, premature failure, and/or corrosion. Furthermore, by decreasing wear of the rotors and stators, the gap between the rotor and the stators may remain substantially constant for a longer time. Because the amount of shear decreases as the gap increases, the rotors and stators of the present disclosure may produce greater, more consistent shear, for a longer time period. In certain aspects, the gap between the rotor and stator may be between about 0.25 and 0.8 mm. Such a gap may result in sufficient shear to produce acceptable wellbore fluid rheology. Those of ordinary skill in the art will appreciate that the gap between the rotor and stator may vary depending on the requirements for mixing particular fluids. In certain embodiments, the gap may be greater than 0.8 mm and still be effective for mixing fluids. Thus, by preventing wear to the rotors and stators the effectiveness of the mixer may be maintained.

In a laboratory environment, traditional mixing methods, including mechanical agitators, were not able to dissolve a dry particle, such as calcium chloride, into an oil-based or synthetic-based wellbore fluid. A laboratory impeller/mixer was also unable to dissolve calcium chloride into the wellbore fluid. By adding calcium chloride to the wellbore fluid and allowing the mixture to rest, after a month the salt was dissolved as determined visually on sufficient size of the mesh screen and also by measuring the amount of chlorides in the mud.

By utilizing a rotor-stator having a shear rate of approximately 10,000 s$^{-1}$ and a similar geometry to that disclosed in U.S. patent application Ser. No. 13/129,429, the salt was dispersed and dissolved into the aqueous phase (or non-oleaginous phase) of the invert emulsion. To determine the amount of salt in the aqueous phase, titration methods, such as API 13-B Standard or visual detection of salt crystals on a fine mesh screen may be used. Engineering calculations based on rotation per minute (RPM), geometry of the mixer and mixing chamber, shear number, and other measured or calculated data may determine shear rate. These engineering calculations are known to one of ordinary skill in the art and can be found in engineering literature. Shear rates of about 30,000 s-1 or higher provide methods to incorporate amounts of additives such as dry particles, up to saturation, into an invert emulsion, specifically the non-oleaginous phase. The mixing unit and shear rates may be selected to provide particle reduction, dispersion and dissolution of additives into an emulsion, such as an invert emulsion wellbore fluid. Specifically, an additive may effectively be reduced, dispersed, dissolved, and/or placed in direct contact with a water phase which is encapsulated by an oil phase within the invert emulsion wellbore fluid. By utilizing shear rates of about 30,000 s-1 or higher, the invert emulsion may be more stable than by simply dissolving the salt into the invert emulsion.

The invert emulsion fluids may further contain additional chemicals depending upon the end use of the fluid so long as they do not interfere with the functionality of the fluids (particularly the emulsion when using invert emulsion displacement fluids) described herein. For example, wetting agents, organophilic clays, viscosifiers, fluid loss control agents, surfactants, dispersants, interfacial tension reducers, pH buffers, mutual solvents, thinners, thinning agents and cleaning agents may be added to the fluid compositions of this disclosure for additional functional properties. The addition of such agents should be well known to one of ordinary skill in the art of formulating wellbore fluids and muds.

Although only a few example embodiments, means, and materials have been described in detail above, those skilled in the art will readily appreciate that many modifications are possible in the example embodiments without materially departing from the scope of the appended claims. Accordingly, all such modifications, including functionally equivalent structures, methods, and uses, are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
    feeding an invert emulsion wellbore fluid previously used in an oilfield operation, the invert emulsion having an internal phase comprising a brine, into a mixing unit;
    adding an additive comprising a dry salt to the mixing unit;
    delivering the invert emulsion wellbore fluid and the additive to one or more stages of the mixing unit, and
    subjecting the invert emulsion wellbore fluid and the additive to mixing in at least one stage of the mixing unit to dissolve the dry salt into the internal phase of the invert emulsion wellbore fluid;
    wherein the mixing has a shear rate ranging from about 10,000 s-1 to about 100,000 s-1.

2. The method of claim 1, wherein the invert emulsion wellbore fluid comprises at least one of a group of oil-based wellbore fluids and synthetic wellbore fluids.

3. The method of claim 1, wherein the invert emulsion wellbore fluid comprises an oil-based wellbore fluid.

4. The method of claim 1, wherein the invert emulsion wellbore fluid comprises a synthetic wellbore fluid.

5. The method of claim 1, further comprising collecting the invert emulsion wellbore fluid from a wellbore prior to injecting into the mixing unit.

6. The method of claim 1, wherein the dry salt is selected from alkali and alkaline earth halides, organic salts or mixtures and combinations thereof.

7. The method of claim 6, wherein the dry salt is selected from sodium chloride, sodium bromide, calcium chloride, calcium bromide, potassium chloride, ammonium chloride, magnesium chloride, sodium nitrate, potassium acetate, zinc bromide, and zinc chloride.

8. The method of claim 1, wherein the additive is added upstream to the mixing unit.

9. The method of claim 1, wherein the additive is added directly to the mixing unit.

10. The method of claim 1, wherein the additive and wellbore fluid are mixed prior to being delivered to the mixing unit.

11. The method of claim 1, wherein the mixing unit is a rotor-stator mixing unit.

12. The method of claim 1, further comprising delivering the wellbore fluid to a second stage of the mixing unit.

13. The method of claim 1, wherein the mixing unit comprises at least one or more stages comprising a tooth spacing configured to provide one of a coarse, medium, fine, or superfine product.

14. The method of claim 1, wherein the wellbore fluid is fed at a rate of up to 1,000 gallons per minute.

15. The method of claim 1, wherein the delivering the invert emulsion wellbore fluid and the additive to one or more stages of the mixing unit produces a product stream fed to the mixing unit.

* * * * *